(12) United States Patent
Gurin

(10) Patent No.: US 10,959,044 B1
(45) Date of Patent: Mar. 23, 2021

(54) KNOWN BLIND SPOTS FOR LOCATION ACCURACY IMPROVEMENTS OF WIRELESS DEVICES

(71) Applicant: Michael Gurin, Glenview, IL (US)

(72) Inventor: Michael Gurin, Glenview, IL (US)

( * ) Notice: Subject to any disclaimer, the term of this patent is extended or adjusted under 35 U.S.C. 154(b) by 386 days.

(21) Appl. No.: 15/437,355

(22) Filed: Feb. 20, 2017

(51) Int. Cl.
*H04W 4/02* (2018.01)
*H04W 4/021* (2018.01)

(52) U.S. Cl.
CPC .......... *H04W 4/023* (2013.01); *H04W 4/021* (2013.01)

(58) Field of Classification Search
CPC ............................ H04W 4/023; H04W 4/021
See application file for complete search history.

(56) References Cited

U.S. PATENT DOCUMENTS

| | | | | |
|---|---|---|---|---|
| 5,276,277 A | * | 1/1994 | Hightower | ........... H05K 9/0003 174/376 |
| 9,668,146 B2 | * | 5/2017 | Lau | ........................ H04W 24/10 |
| 2015/0323206 A1 | * | 11/2015 | Chan | ........................ F24F 11/30 700/29 |
| 2017/0311127 A1 | * | 10/2017 | Murphy | ................. H04W 4/026 |
| 2017/0345313 A1 | * | 11/2017 | Kazemian | ............... G01S 13/58 |
| 2018/0176755 A1 | * | 6/2018 | Zhao | ..................... H04W 16/02 |

* cited by examiner

*Primary Examiner* — Mehmood B. Khan

(57) ABSTRACT

The present invention is a precision location system for wireless devices within a host system using known location of blind spots or partial blind spots to advantageously increase the accuracy of location determination. The host system with known blind spots is particularly adept at providing the control system with precise location accuracy for determining the entering or departing of a known geofence zone by a wireless device host.

3 Claims, 10 Drawing Sheets

Top view

With Blindspot Calibration

Top view

Without Blindspot Calibration

KNOWN BLIND SPOTS FOR LOCATION ACCURACY IMPROVEMENTS OF WIRELESS DEVICES

FIELD OF INVENTION

The present invention relates to the strategic use of purposeful located non-transmitting zones to increase the precision of location for a wireless device.

BACKGROUND OF INVENTION

Prior art focuses on a wide range of wireless methods to determine location, with virtually all of them failing to achieve high enough accuracy particularly in regions where high precision is required including instances in which precision is relative to absolute certainty of being within a blind spot or a geofence in known proximity to the blind spot. Integrating precise identification devices within the blind spot is cost prohibitive as well as requiring the wireless device to have yet another wireless communication method. The wide-scale adoption of wireless device onboard sensors, particularly within smartphones, has been utilized to increase location accuracy but all failing to achieve high precision (i.e., in most instances not less than a few feet, and in rare instances certainly not less than a few inches) and not without significant cost both economically and energy usage by the wireless device.

The wide-scale adoption of smartphones, logistic delivery and pickup kiosks, ride sharing vehicles, automated guided vehicles, drones, salad bars, energy/building automation, automated shopping systems etc. can be enhanced by gaining high-precision through the placement of non-onboard (relative to the wireless device's calculated location) sensors particularly when the location is utilized by the host system in which the wireless device is communicating with at minimal cost by strategic placement of wireless device blind spot(s). The present invention includes multiple embodiments of strategic placement and integration of at least one known blind spot whether the blind spot is permanent or temporary depending on the prioritization of the wireless user and/or host system interacting with the wireless user.

SUMMARY OF INVENTION

The present invention is a system of configurable blind spots at previously known location of the blind spot(s) and previously known geofence(s) in combination to increase the location precision/accuracy to obtain precise location relative to a mobile wireless device as compared to traditional wireless device location determination without the benefit of any blind spots in a known location.

A further object of the invention is to use the known location of the blind spot and the timing of when a wireless device loses its location determination (and/or its ability to communicate its location, and/or its signal strength reduction) combined with the precise timing of the loss of wireless communication in further combination with the last known location vector (preferably including real-time velocity and particularly preferred also including historic records of velocity) as obtained by the wireless device location system to increase the location precision/accuracy to obtain precise location relative to a mobile wireless device as compared to traditional wireless device location determination without any blind spots having a known location.

Yet a further object of the invention is to combine the known blind spot with a precisely positioned line of sight presence sensor within the known blind spot such that the sensor, notably a non-identity recognizing sensor (i.e., a simple digital absence/presence sensor, or otherwise referred to as a non-identifying digital sensor) is at a precise known location, and where the precise time of the communication loss in combination with the last known wireless location vector to obtain precise location relative to a mobile wireless device enables precise determination of the wireless device within the known blind spot location. The non-identity recognizing sensor becoming present in combination with the blind spot losing wireless device location provides precise timing of each respective event as a method of ensuring ultra-high precision location accuracy.

It is another object of the invention to combine a known location of a wireless power distribution system having a known density of power transmission as a function of distance with a traditional wireless device location determination without any blind spots also having a known location relative to obtain precise location relative to a mobile wireless device.

It is a further object of the invention to utilize the ultra-high precision location system using at least one blind spot within a salad bar (analogous to a beverage bar, ice cream bar, fruit bar, or in general any dispensing bar that has multiple dispensing containers within the bar) system; a logistics kiosk system; a ride sharing system, automated parking facilities, energy automation, returnable packaging systems, agricultural and food growth/production systems, and any other system in which precision is required for entry/departure into a specific geofence zone to obtain precise location relative to a mobile wireless device.

Another embodiment of the invention is the utilization of a wireless reflection system (e.g., WiFi) that has multiple transmitters (but different network IDs) and reflection receivers; preferably with receivers being directional antenna arrays such that the wireless transmitter (or transceiver) system reflects back from at least one of the antenna (s) or portion of the antenna array and the utilization of the directional antenna provides additional location determination information through the use of intentional blind spots within either the directional antenna and/or within the system of wireless transmitters and/or transceivers.

Yet another embodiment of the invention is to leverage location determination via wireless power distribution, since density of power is very homogeneous and yet linear as a function of distance away from wireless power transmitter; this is in combination with a WiFi reflection directional antenna. The reflected communication back includes the wireless power energy density received by the wireless device, which provides a high reliability distance from the known wireless power distribution location.

DEFINITIONS

Figure 1:
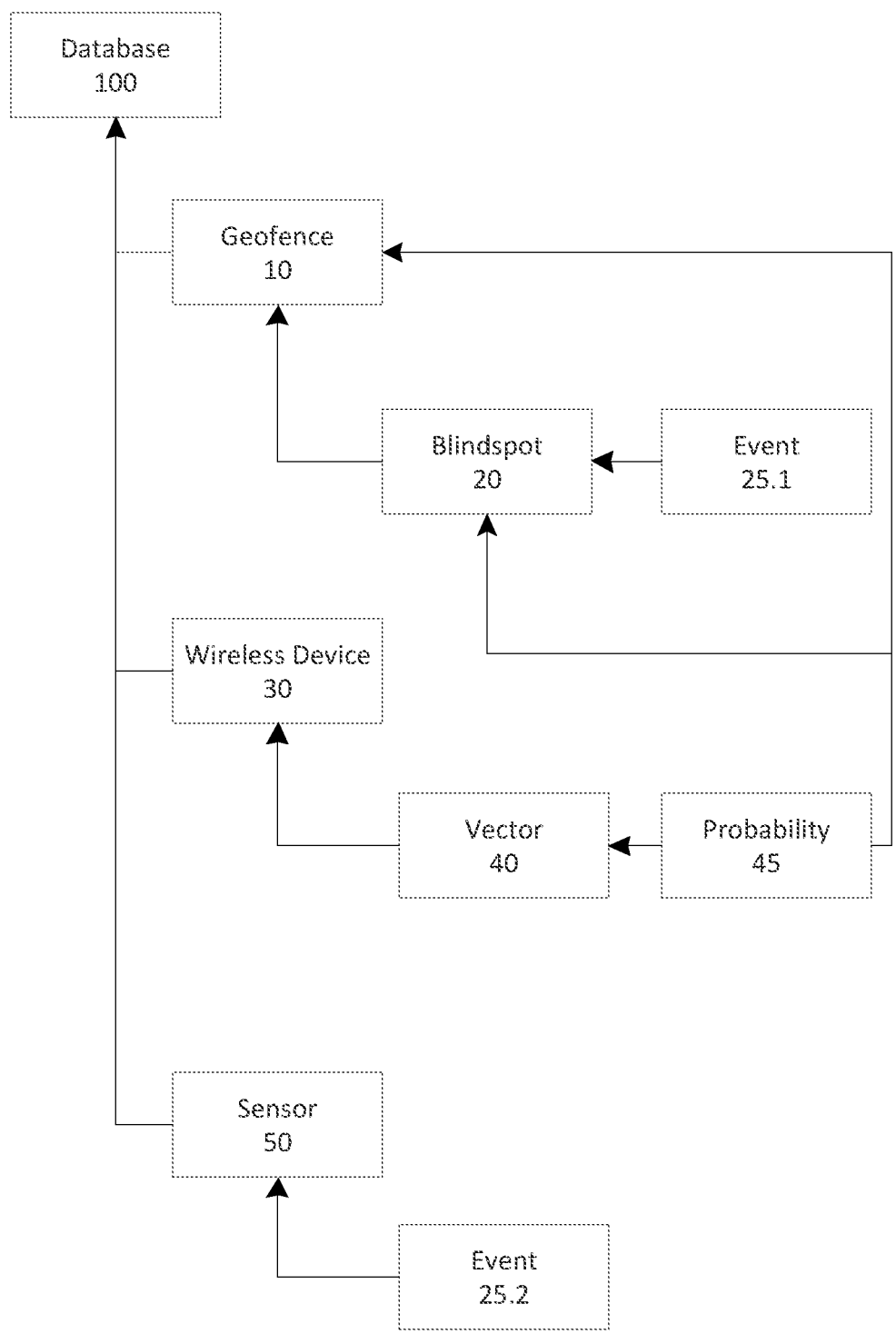
FIG. 1 is an object-oriented database structure diagram

The term "autonomous" refers to a vehicle which drives without input from a person, i.e., is driven by any embodiment of a computer (i.e., artificial intelligence, used interchangeably with "A.I.") as known in the art. In the present invention, autonomous mode may not require human presence within the vehicle for driving or may use remote control/access. This mode minimizes or eliminates the need for a dashboard, which may increase the space available in courier mode. The term "non-autonomous" refers to a vehicle which primarily requires a human driver control, with or without computer/A.I. assistance (such as blind spot (also shown as blindspot indicating similarity to a classically defined "blind spot" but also inclusive of where the wireless device has a wireless signal strength change dS as a function of time dt above a dS/dt threshold) alerts or parking assist as known in the art). These modes are mutually exclusive with each other.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

Logistics kiosks such that the wireless device is put into a device specifically with the purpose of making the wireless device fail to communicate with the host system. The addition of a presence sensor within the blind spot device provides precise timing of the presence in which the host system utilizes the precise timing of the wireless device loss of communication to calibrate the precise location of the wireless device. This is identical to an entry access point, such as a public building that needs to provide secure access control. Additional devices requiring identical functionality include automated functions including washing machines an dryers configured with automated loading/unloading functionality in which a logistics "shuttle" presence (and need to know/confirm) with unique identifier of the "delivery" by the shuttle. Yet another embodiment is a returnable packaging system "RPS", where the requirement of low cost (and the high potential for the RPS to not be returned) cost yet need to provide security with unique identifier prevent traditional RFID systems to be utilized and other known unique identifiers require too much precision of reader in orientation to the identifier transmitter. The use of at least one known blind spot enables the RPS to provide high-precision location accuracy, therefore the determination of the unique secure identifier becomes known.

The combination of the known blind spot also serves as a continuous re-calibration method such that the accuracy of the wireless device location can be improved.

Since a fundamental purpose of the host system is for repeated use, it is an object of the invention to utilize the blind spot re-calibration as an ongoing system to continuously improve the accuracy of the location determination for subsequent use by the wireless user even if the blind spot has not yet occurred in the subsequent second use by the wireless user. The first use of the blind spot by the wireless device becomes a re-calibration vector record for the at least second and subsequent use by the wireless device. It is understood that the re-calibration vector record is portable to other host systems configured in similar manner of wireless transceiver in combination with the blind spot location.

It is an object of the invention to use wireless transceiver such that the wireless device transmits its location information including an antenna reflection using harvested power from the host system wireless transceiver.

The further combination such that the blind spot is concurrently a wireless power transmitter (i.e., a wideband transmitter) such that the wireless device has at least one narrowband rectifier antenna to directionally reflect a location signal as received from the wireless power transmitter.

When the wireless device location determination is only needed at its transit endpoints, then the wireless power transmitter within the blind spot enables controlled and effective location determination only within range of the known blind spot endpoints. A long duration of time when the wireless device is not within the transit endpoint creates a known exception within the host system.

It is a further object of the invention that the wireless power transmitter within the blind spot serve to provide sufficient power to the wireless device to transmit at least its known identity and preferably in combination with narrowband antenna having directional reflection of the received wireless power such that both the known identity and location are determined by the host system through the host system wireless receiver (at known positions relative to the known blind spot). Exemplary of this is a serving spoon within a dispensing container, such that the dispensing container has a wireless power transmitter where the container itself shields the receipt of the wireless power to the host system receiver, therefore the serving spoon is only capable of reflecting its location when the serving spoon itself is within the range of the blind spot of the dispensing container and the top of the serving spoon with its embedded reflecting directional transmitter such that the host system determines the serving spoon location. Therefore, the serving spoon requires either a very small battery or no battery at all as the durations in which it transmits is only when in proximity to a known blind spot.

It is further understood that the blind spot can also be a partial blind spot such that a significant reduction of wireless device signal by the host system, preferably by at least 20% of the signal strength, particularly preferred by at least 50% and specifically preferred by at least 80% of the signal strength such that the blind spot is at a known location with respect to the then present known wireless device vector location. This mode of operation is of particular interest as it is an object of the invention such that the host system knows when the wireless device enters or leaves a known geofence in most cases much more importantly than the precise location in non-precise-geofence regions. It is understood that the wireless communications can be radio frequency "RF" and/or photonic (e.g., LED, infrared or visible) and that the combination of RF and photonic wireless communications with known blind spot of at least one of the RF and photonic wireless communications significantly increases the accuracy and precise knowledge of entering or leaving a known geofence region (whether that geofence region is less than 1 mm or less than 1 foot). It is further understood that the combination of a camera with at least one known blind spot serves as both a calibration enhancement system as well as precision of entry/departure into the known blind spot, which when strategically located provides precision of entry/departure into a known geofence (i.e., a trigger event for entry and/or departure).

Another objective of the known blind spot is for the absence of the wireless device to signal at the precise moment in which it enters the known blind spot, this ensures that adequate energy is stored within the wireless device between instances in which it receives wireless power yet only needs to provide a location signal concurrent with the entry or departure from the known blind spot.

A key object of the invention is that the location accuracy is highest when the wireless device enters/departs the known location of the blind spot.

Another embodiment of the invention is that the location accuracy is highest when the wireless device enters/departs the known location of the blind spot to further establish a calibration vector to increase the accuracy (though less than the moment at which the wireless device goes "blind") in between a known location of at least two blind spots. It is understood that the presence of a now more accurate travel pathway can increase the accuracy of any action which took place between the at least two blind spots and that the newly updated and more accurate travel pathway can retroactively improve the accuracy of the actions that took place.

It is another object of the invention such that the combination of a known blind spot, a known geofence in proximity to the known blind spot, and a specific operator of the wireless device increases substantially the accuracy of determining location and timing of a trigger event for the entry/departure of the specific operator from the known geofence.

The utilization of the known blindspot with at least one known wireless reflection transceiver having a directional antenna (preferably with the directional antenna within each beam area having either a different transmitted strength and/or frequency) and the wireless mobile device having a wireless reflection transceiver also having a directional antenna provides an ultra-high precision location of the host wireless mobile device. The wireless reflection system preferably has multiple transmitters and multiple directional antenna beams (also preferably) each with a distinct network ID. The wireless mobile device has embedded capability to sequentially reflects back only the strongest signal received, so as to minimize signal reflection off of other objects except for the wireless mobile device.

The invention is readily applied for the ride sharing within vehicle application where the safety of ride-sharing passengers (or driver) is critical and thus the entry of the ride-sharing passenger into the ride sharing vehicle is largely based on the identity of the passenger entering the vehicle in terms of safety of existing passengers already in the vehicle, while the safety of the new passenger about to enter the vehicle is largely based on the identity of the already existing passengers already in the vehicle. Each transfer of passengers (it is understood that the reference to a passenger in this instance makes no distinction between a person that is a "passenger" versus a person that is a driver) into the vehicle, and each discharge of passengers out of the vehicle is the most critical both in which a blindspot (or at least partial blindspot) is present. The presence of the blindspot provides precision of timing and location for the passenger transfer. In terms of the passenger transfer, it is at least as important for precise control of the vehicle location relative to other vehicles in close proximity particularly for autonomous (or even as a safety for semi-autonomous) mode. A transport hub in which passengers (and/or packages from a logistics delivery system) into at least two (and most scenarios many more) vehicles in which the vehicles must autonomously move and coordinate to properly sequence the vehicles in a coordinated manner at a coordinated geofence zone. The utilization of a known blindspot provides precise location determination and a precise calibration vector especially when combined with at least one wireless location method. Precision calibration vectors in combination with known vehicle type and known blind spot provides repeatability with ultra-high geofence entry/departure precision. The ability to accurately know the direction in incoming wireless power and/or RF signal into the antenna provides for high predictability and accuracy of "reflective" signal from the wireless device (i.e., the transmitter, whether it be from harvested incoming energy or onboard battery), the wireless device transmitter is preferably and optionally having a directional transmitting antenna providing ultra-high geofence entry/departure accuracy.

The invention is also readily applied to the logistic delivery and pickup/dropoff kiosks where the transport of packaging within a logistics ecosystem, exemplary of trucks, drones, shuttles, or automated guided vehicles operates like the aforementioned ride-sharing vehicles. The pickup/dropoff kiosks of traditional systems is expensive by the nature of multiplying costs of individual locking (and securely unlocking) by the total number of lockers within each pickup/dropoff a.k.a. "POC kiosks" becomes very significant, not to mention a long-term maintenance nightmare. The use of the inventive wireless device in combination with at least one known location blind spot provides the precision and timing accuracy required to virtually eliminate the significant cost of having a full securely unlocking mechanism and replace it with an individual low cost unlocking mechanism that achieves the accuracy, precision of identity by emulating a fully secure unlocking mechanism such that the ultra-high precision location determination with ultra-high precision timing accomplishes the same end result without the expense of each locker having its own identity reader.

Turning to FIG. 1, the location accuracy improvement system "LAIS" leverages a database object-oriented structure in conjunction with physical components (including hardware) to establish inter-relationships of the various objects. The database 100, which is preferably present near to LAIS physical location, as known in the art enables faster response times. The database has an overall location, such as a restaurant or logistics center, in which geofence(s) 10 are established (specifically for where critical events are triggered when multiple geofences 10 overlap, an object (that can also be represented by a geofence 10) enters/leaves the geofence 10, or notably when a blindspot 20 has been entered/departed. The blindspot 20 is represented as a physically defined multi-dimensional space, such as a geofence 10 in which a wireless device 30 has a signal strength that varies greater than a wireless threshold. It is further understood that the wireless device 30 (though not shown in this figure) is almost always linked (or owned) by a guest 230 (also interchangeably referred to as host, which can be a human being, an animal, or even a drone) such that the combination of wireless device and guest is critical towards increasing precision of location calibration or entry/departure of geofence. One such example is that a guest wears the wireless device in different places (e.g., purse, hand, belt, wrist, etc.) and thus a non-blindspot 20 location accuracy is less accurate than a blindspot 20 location accuracy that accounts for the combination. Furthermore, the maintaining of historic records (not shown in this figure) for the combination of guest, wireless device 30, location relative to a geofence 10 (particularly a geofence defined in part by a blindspot) for location re-calibration greater increases the location accuracy. Another further database 100 record for characterizing time of day is also an optional enhancement that particularly accounts for the guest having different clothing (e.g., shoes, coats, gloves, etc.) that often impact how the guest 230 wears the wireless device 30 as a function of weather as well as nature of activity conducted at the location in which location accuracy is being determined. A blindspot 20 physical space is a function of guest 230 wearing a wireless device 30 in a specific manner (e.g., belt, wrist, etc.) and wearing a specific set of clothing. The blindspot 20 is a critical feature of the invention so to calibrate, without any guest involvement (or at least minimal) the location accuracy. The blindspot 20 provides a superior trigger point of an event 25.1, or can additionally be coupled to an identical event also linked to a host sensor 50 event 25.2 (such as a motion sensor or camera that precisely detects physical entering/leaving of a guest into a blindspot). Knowledge of who the guest 230 is often critical to enhancing the performance of the host control system in which the LAIS provides location information to. Yet, it is very costly to have each geofence 10 or blindspot 20 feature hardware that has unique identification capabilities. Furthermore, the simple inclusion of another unique identification device does not increase location accuracy as the wireless device 30 is just replacing one less than precise location determination system with another. More importantly, the timing accuracy for triggering an event 25.1 or 25.2 when the guest enters/leaves the specific blindspot 20 or geofence 10 effectively prohibits the wireless device 30 from establishing a "communication channel" with a new unique identification device. Thus it is an essential feature of the invention to utilize a blindspot 20 to establish both precise location, precise timing, and precise identification of the guest with respect to the respective geofence 10 and/or blindspot 20. Intentionally placed blindspot(s) 20 provide location precision whether it be from real-time calibration (without guest interaction) or from known impact of signal strength loss (which is substantially more accurate to determine location than traditional wireless device location triangulation or GPS especially when indoors). The movement of the guest 230 within the physical space in which the LAIS is operation is best represented by vector(s) 40 that contains directional information as obtained by the wireless device notably including wireless signal strength and velocity. This inventive vector (location, speed, wireless strength) becomes directly linked to a blindspot, thus becoming directly linked to a geofence notably when in fact the wireless device location mechanism (particularly indoors) doesn't even place the wireless device in close proximity to either the correct geofence or blindspot. A historic database of vectors, indexed to guests (and their calibration parameters, which can include weather, clothing, and time of day) is subsequently utilized to establish precision of location and triggering of events linked to blindspots 20 and/or sensors 50.

Figure 2:
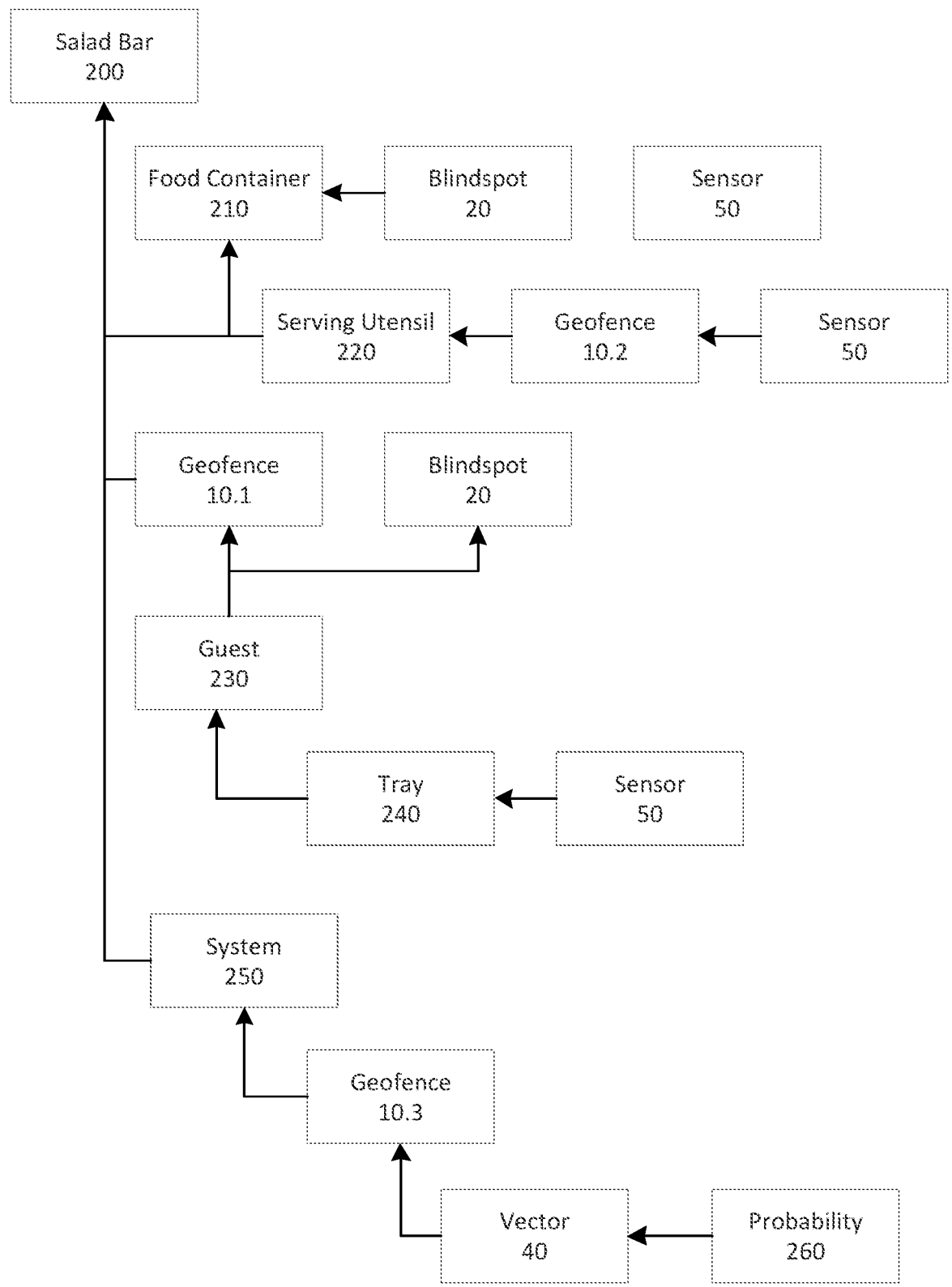
FIG. 2 is an object-oriented database structure diagram for a salad bar embodiment

Turning to FIG. 2, FIG. 2 is an embodiment of the invention as a salad bar 200 (which can be virtually any dispenser, particularly suitable for dispensing to multiple guests concurrently). A salad bar has numerous fundamental challenges not the least of being many containers 210 that require an ability for each container to be sanitized under relatively high temperatures, which are significantly adverse to electronics and sensors. Therefore, the inventive method of utilizing a container shrouded by a blindspot is a superior method to avoid both expensive electronics and sensors designed for the aforementioned challenges. The preferred embodiment utilizes a reflective directional antenna or a passive RFID, such that the energy required for wireless detection is from the transmitter and further such that the energy required is not capable of passing through at least one blindspot and preferably none of the blindspots. Each food container 210 has an optional sensor to detect the weight of the contents, though preferably the optional sensor 50 is not within the container but rather below each container in physical communication with the container 210. Another embodiment is the container 210 and serving utensil 220 within the salad bar being void of sensors, with sole reliance on a sensor 50 being on the tray 240 used by a guest 230. The wireless device 30 can be on the guest, as noted earlier whether that be on the waist, wrist, or placed on an article of clothing (not shown), or on the tray 240. The preferred embodiment is the wireless device being on the tray 240 closely coupled to an embedded sensor 50 such that the embedded sensor provides the weight of food contents on the tray. Salad bars—a salad bar, or virtually any dispensing bar, has two critical regions the ingredient dispensers (i.e., the salad bar) and the tray in which the ingredients are being dispensed onto (though of course on a plate or a bowl). The preferred embodiment has an embedded weight sensor to measure both absolute weight of the cumulative ingredients as a well as incremental ingredient as specifically determined by the location system (that has at least one wireless location antenna and at least one known location blind spot).

The particularly preferred embodiment is such that the system has a series of geofences 10.3 and blindspots 20, containers 210 that define the relative locations of each container 210 to serving utensil 220 to tray 240 as defined to a geofence 10.3 with the relative location in a database record of vectors 40 and probabilities 260 of determining a serving utensil coming from a container 210 to a guest tray 240. The blindspots are strategically located such that the transition from the salad bar storing the containers has at least one known blindspot as the serving utensil 220 moves from the container 210 to the tray 240 and return trip back. The use of the probabilities is of particular requirement when multiple guests 230 with their respective tray 240 so as to ensure the transfer of food from the container to the tray ensures accuracy of the weight of each food ingredient. The order of adding each ingredient is inclusive in the recipe specific to the guest. A further use of a camera enables the adding of each ingredient to include the pattern in which the ingredient is placed on the tray.

Figure 3:
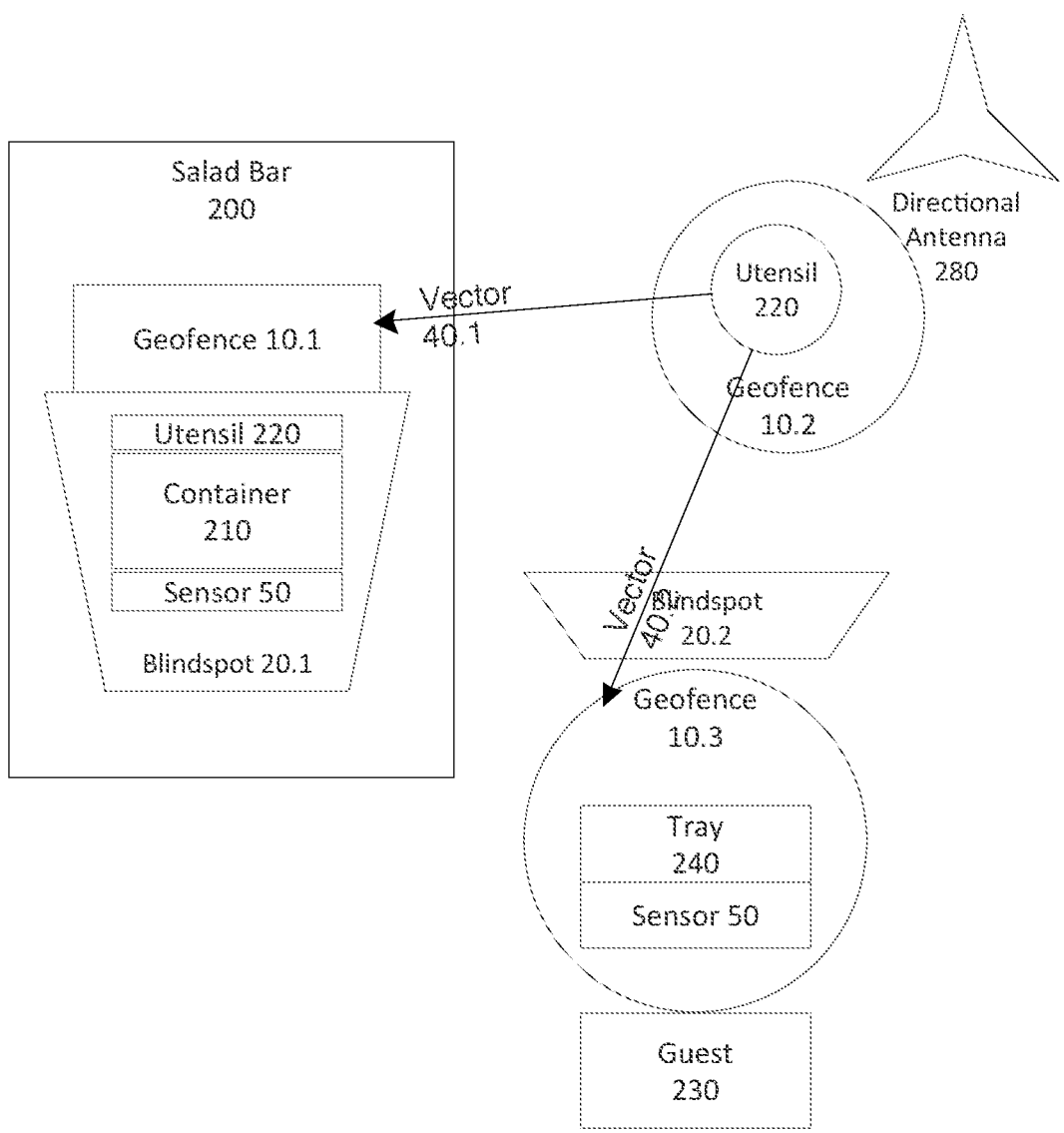
FIG. 3 is a general physical layout of the salad bar embodiment

Turning to FIG. 3, FIG. 3 provides a physical layout of each component within the salad bar 200 embodiment. The container 210 preferably has a physically connected sensor 50, optional and operable to weigh the contents within, both being shrouded by a blindspot 20.1 such that the serving utensil 220 loses (or greatly reduces its wireless signal strength) as it transitions to/from the container 210 from/to the tray 240. Each container 210 physical space is defined within a geofence 10.1. The location of the utensil relative to the geofence 10.1 is defined by vector 40.1, with the utensil being a mobile geofence 10.2 such that overlaps (i.e., providing for entry/departure) of the utensil geofence 10.2 to the container geofence 10.2. Likewise, the utensil 220 geofence relative location to the tray geofence 10.3 is defined by vector 40.2. It is essential to the embodiment that the utensil as it transitions from the container to the tray enters a defined location blindspot 20.2 such that entering the blindspot triggers the increase in location precision to ensure accuracy of location and thus accuracy of guest salad recipe by ingredients. The utilization of at least one direction antenna 280 further enhances the improvement of location accuracy as the utensil enters/leave each blindspot.

Figure 4:
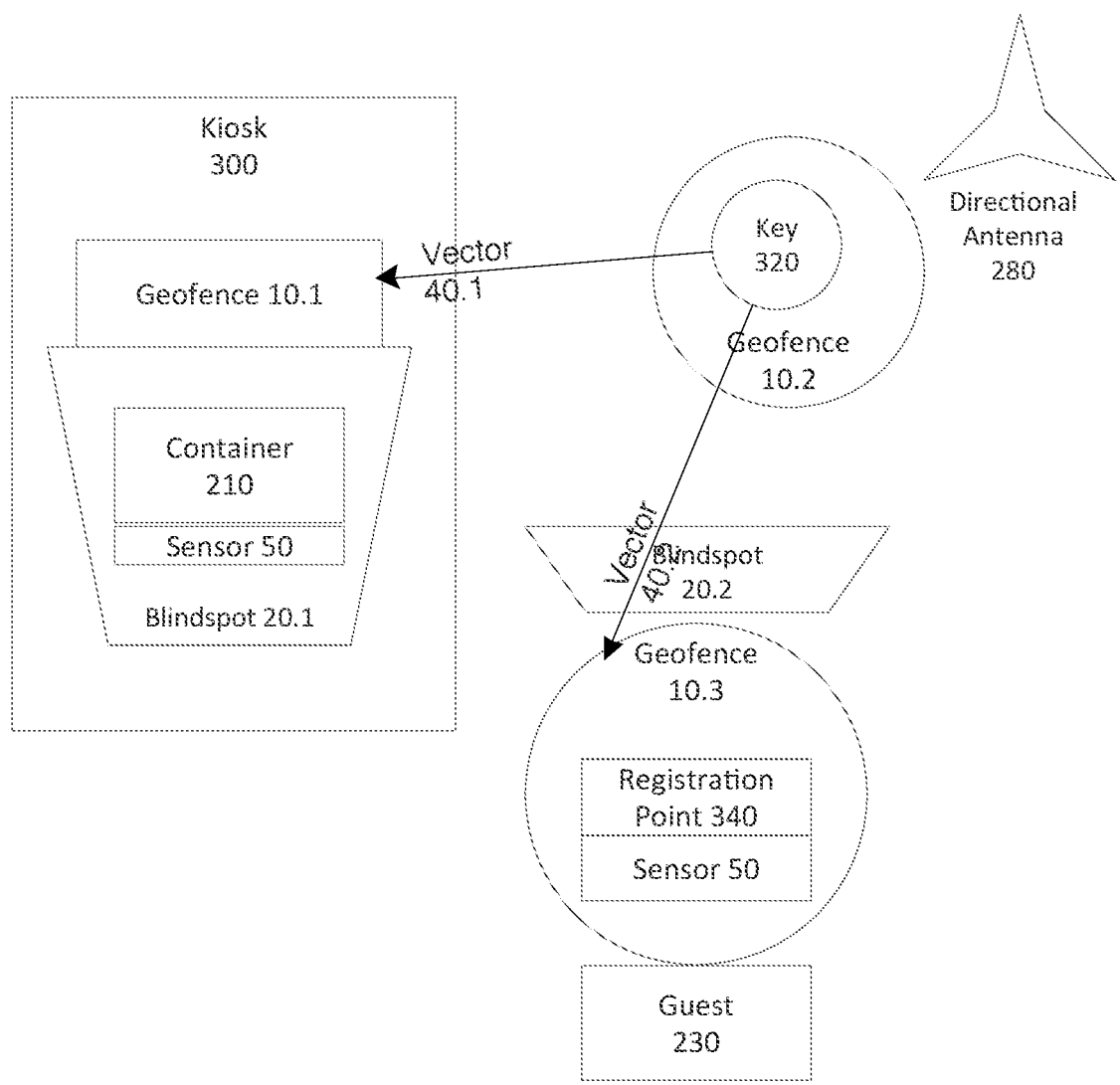
FIG. 4 is a general physical layout of a logistics kiosk storage embodiment

Turning to FIG. 4, FIG. 4 is very similar to the salad bar embodiment though in this instance for a logistics storage system comprised of multiple lockers in which guest remove/place objects to exchange possession. The kiosk 300 is comprised of at least two containers 210 having an optional sensor (i.e., emulating a lock with unique identifier capabilities). The preferred embodiment of the logistics kiosk system is such that the guest 230 experiences the illusion that the physical placement of a sensor (i.e., "key" 320) by the container 210 in which the guest's belongings are being taken from or placed into unlocks the respective container providing access. Individual locks for each container is very expensive, thus the preferred embodiment has a 1-wire communication to a relay capable of locking/unlocking the storage container. The position of the key 320 relative to the correct storage container 210 is defined by vector 40.1, such that the key in its precise location for "unlocking" the container is concurrent with the key entering a blindspot also defined by vector 40.2. Likewise, the key 320 passes through a blindspot 20.2 providing a registration/calibration 340 point to improve the location accuracy. It is optimal for the registration point 340 to integrate a passive RFID device to establish a unique identifier of the guest, such that the container can be void of any unique identifier. It is understood that the registration/calibration 340 point can be achieved through a guests cellular device having a GPS (or other location determination method), though this primary method is grossly deficient in establishing a precise location as required to authorize opening of storage container 210 such that items placed in the container 210. A more localized directional antenna 280 in conjunction with the use of blindspot(s) 20.2 further increases the location accuracy of the key relative to the container 210 and to the guest 230.

Figure 5:
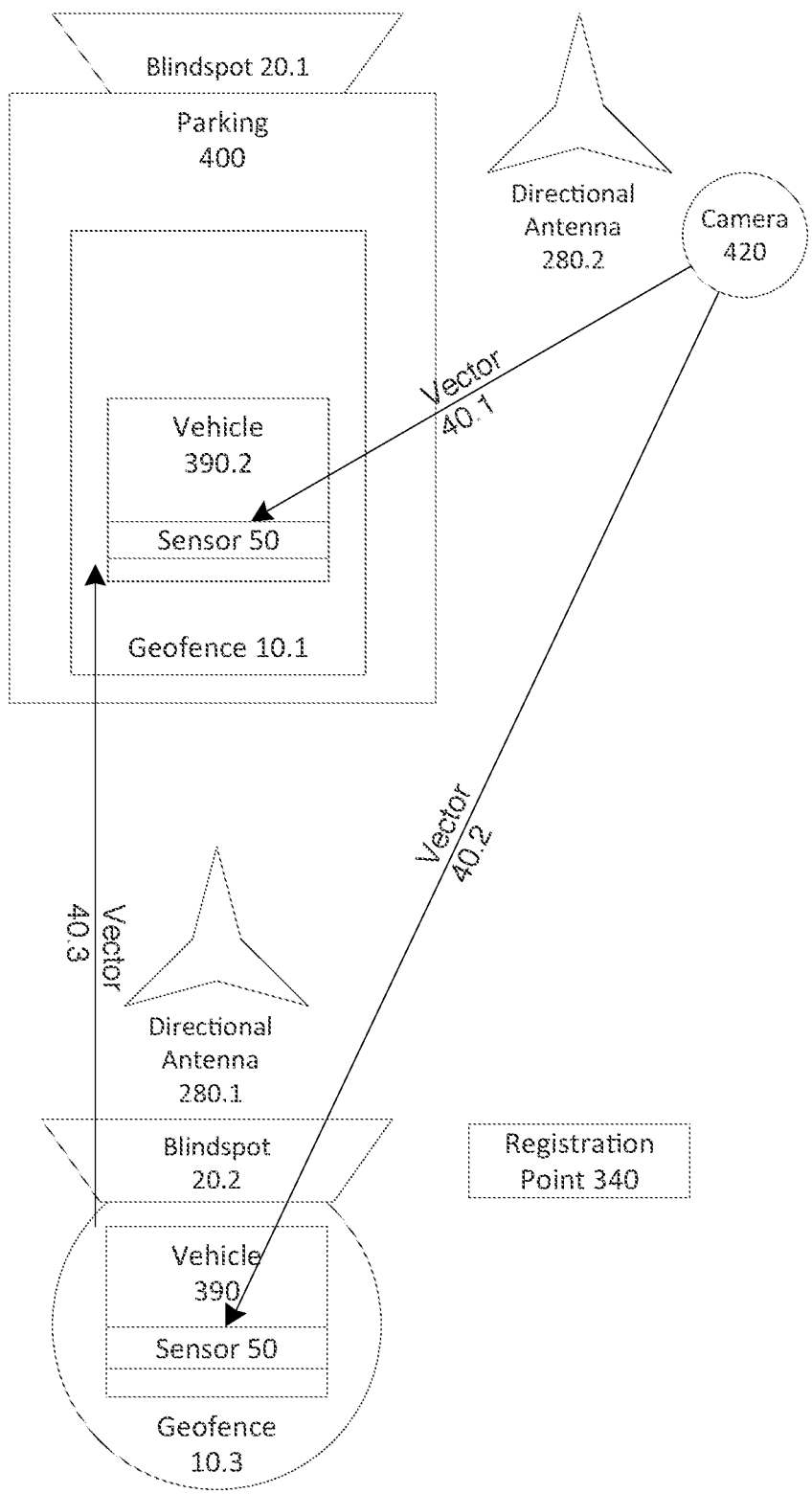
FIG. 5 is a general physical layout of a shared-vehicle parking embodiment

Turning to FIG. 5, FIG. 5 is an embodiment for automated parking of vehicles, notably for shared autonomous vehicles that need to vary queue position within a small confined parking/holding space. The accuracy of traditional wireless device location determination is inadequate to provide crash-free guided movement. Many issues attribute to the insufficient accuracy including variation of wireless device placement on the car body, variation of tire pressure changing wireless device alignment, and variation of directional antenna 280.2 relative to vehicle 390. It is critical to obtaining precise location determination throughout the entire duration of being within the parking/holding 400 space, therefore the inventive blindspot 20.2 is essential to being a registration point 340 in which the unique identification of the vehicle 390 is linked to a visual record as obtained by a camera 420 and a preliminary vector 40.2 enables calibration of the wireless device (also referred to as wireless sensor 50). The distance between vehicles is depicted by vector 40.3 which can be obtained by an onboard front distance sensor (e.g., LIDAR, RADAR, or other known in the art distance measuring devices as required for truly autonomous or semi-autonomous driving) or by continual visual monitoring by the camera 420 in combination with the vector 40.2. The further inventiveness of using the camera 420 to establish two of the vectors 40.2 and 40.1 in combination with the vehicle 390 onboard frontal distance to vehicle in front of the vehicle 390.2 to establish vector 40.3 all in combination with the wireless device location accuracy as calibrated first by blindspot 20.2 (in all instances) and for subsequent repeated used within the same parking facility the historic record of calibration of vectors 40.2 and 40.1 as further improved by the second blindspot 20.1 as well. The utilization of at least two blindspots (20.1 and 20.2) is superior to a void of known blindspot locations and superior to a single blindspot. A second directional antenna 280.1 is preferential included with its position relative to the blindspot 20.2 so as to create a very distinct boundary such that the blindspot maximizes the change in wireless signal strength improving location precision. Additional onboard cameras and/or sensors determining the relative position of each vehicle to each other ensures safe operations and movements of the vehicles throughout the parking/holding 400 place. Each vehicle is represented in the precision location system by a geofence such as 10.3 for vehicle 390. The location system issues movement commands as based on vector adjusted location by way of the blindspot calibration.

Figure 6:
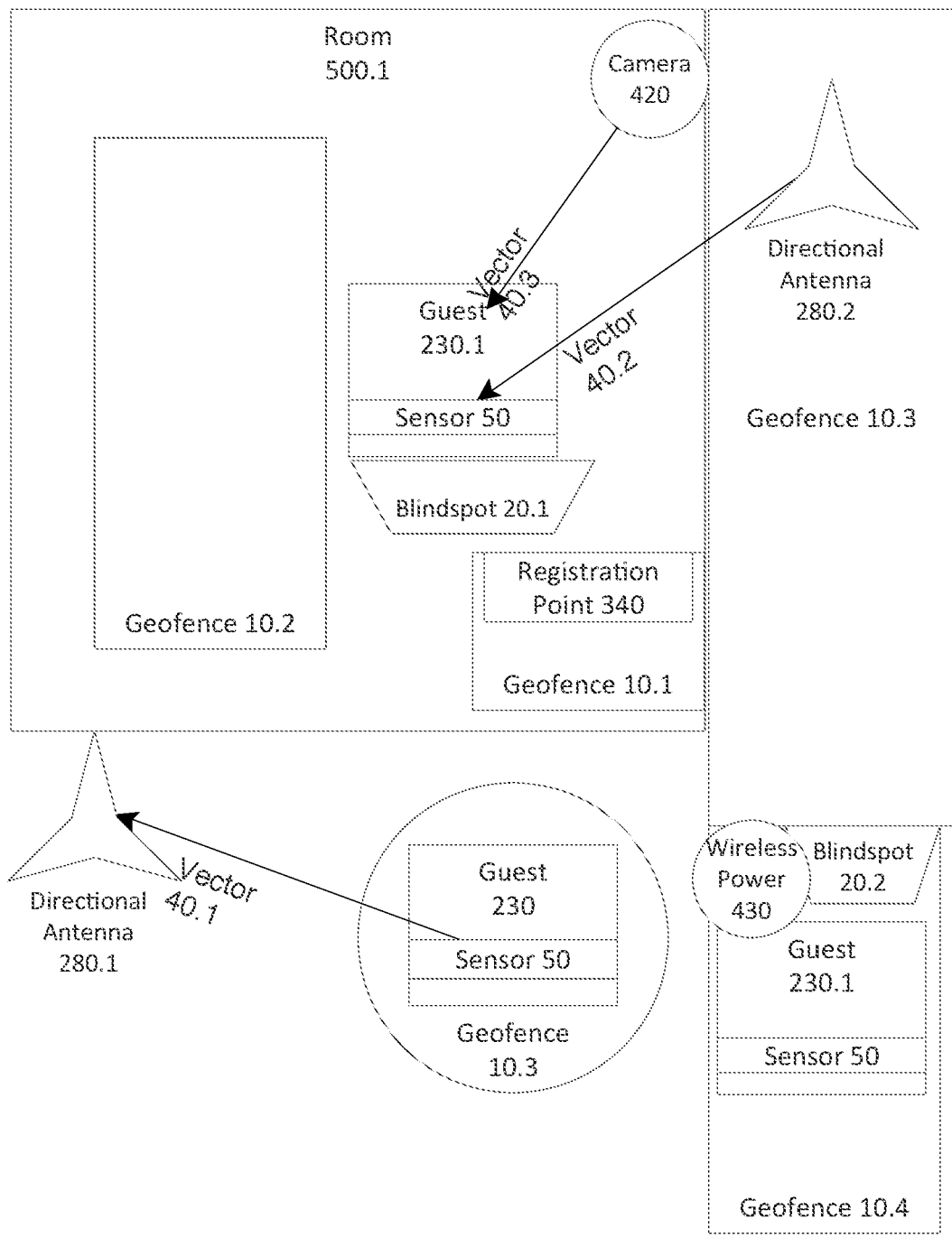
FIG. 6 is a general physical layout of an energy automation embodiment
Figure 10:
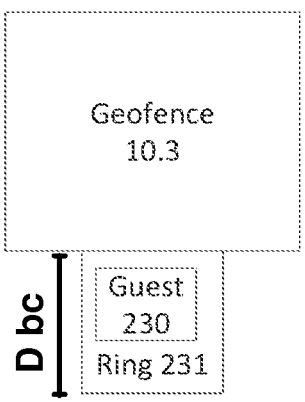
FIG. 10 is a top view physical layout depicting the accuracy variation due to use of blindspot integration
Figure 10:
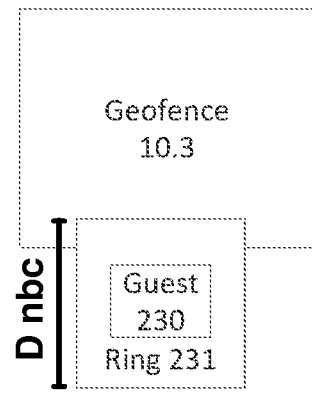

Turning to FIG. 6, FIG. 6 depicts an embodiment that can represent an energy automation application, a guest support application within a hospitality setting, or a wide range of applications in which blindspots enhance location determination/precision (an especially relevant problem for most indoor applications, which ironically require higher location precision than traditional outdoor applications). Indoor location is predominantly used for interaction with other objects (also represented within the system as a geofence) and in particular the purpose is to trigger an event (e.g., task or procedure) upon entry/departure into one geofence or where a geofence overlaps with another geofence again such that the initiation of the overlap (i.e., entry) or subsequent departure of overlapping geofences is critical. One such exemplary is a guest 230.1 walking into a room 500.1 such that the immediate entry into the room requires the lights to be turned on by the energy automation system. Furthermore, knowledge of the guest 230.1 being an actual guest of the room (as opposed to a maintenance person) provides context as to which lights (as well as air conditioning settings) should be on and at which settings. The camera 420 (or motion sensor as known in the art, preferably a motion sensor capable of establishing a movement vector 40.3 however is incapable of establishing guest identification, which is preferably established by the lower accuracy (at least 5% less accurate) wireless device signal strength between the preferred directional antenna 280.2 and guest host wireless device 50 (also referred to as sensor). Depending on the application, the registration point 340 (also referred to as a hybrid calibration point is such that guest wireless device 50 is specifically and uniquely linked to the guest host 230.1. A wireless device location vector (i.e., the presumed location as solely determined by wireless signals) is insufficient to determine precise location as a wide range of physical objects such as walls of a room (i.e., also that can be represented as an area geofence 10.2 within the room 500.1). Geofence 10.3 as depicted represents a hallway that typically has a wireless router represented as a directional antenna 280.2. The wireless power 430 device, capable of providing electrical energy to wireless devices of all types configured with a wireless power receiver in this embodiment serves a secondary purpose of providing a second concurrent measure along with the blindspot 20.2, whereas the blindspot provides a reduction in wireless signal strength (such as from directional antenna 280.2) establishing one dimension in determining a precise location and the energy density at the guest 230.1 also determined by its host wireless device 50 establishes a second dimension with the combination in higher precision (at least 5% more accurate) than just the traditional wireless location mechanism. It is understood that throughout this invention a reference to a 5% improvement is the minimum increase in location precision, and that each such instance is enabled by the invention to achieve preferably at least 20%, particularly at least 50%, and specifically preferred at least 90% improvement of location accuracy (i.e., a reduction in ring 231 (as shown in FIG. 10) relative to ring 231 without blindspot calibration enhancement. A second directional antenna 280.1 as known in the art represents in this embodiment an outdoor GPS such that most outdoor applications have sufficient location accuracy based on the indicative vector 40.1. Traditional triangulation of an outdoor antenna and an indoor antenna are simply not reliable for precise location determination throughout the indoor geofences without calibration points established by the at least one blindspot 20.1 and preferably at least two blindspots (20.1 and 20.2). The combination of vector 40.3 as determined by the camera (or other imaging sensor) 420 and vector 40.2 respectively provides unique identification of the guest 230.1 with location precision as calibrated by the historic records of calibration parameters obtained during the blindspot period of at least one blindspot 20.1 and preferably also from an at least second blindspot 20.2. Energy/building automation—The entry/departure of building occupants into a security controlled building can operate in virtually the same manner of the POC kiosks, though the POC kiosks in fact is optimally configured such that the access control point has an embedded wireless blind spot (that of course is at a known location at least to the host system). Transitions from one geofence zone to another geofence zone is also critical within the functionality of energy (or other functional task initiator) management with one exemplary being the trigger of turning off the lights in an unoccupied room (a.k.a. geofence zone). Large variations of wireless signal direction and strength inherently take place within indoor environments (and as known traditional global positioning system "GPS" are terrible in terms of high precision location determination particularly within indoor environments. The trigger of entering/departing a geofence (or blindspot) and its corresponding speed, particularly when departing the geofence (e.g., room) is a generally indicative factor as to whether or not that same host/guest/person will return to the geofence. An exemplary instance in which such knowledge is very valuable is in determining whether or not the departure from the geofence should include an that turns off the lights immediately (or at least shorter than if the guest is expected to return even if a motion sensor determines there is no activity). The further knowledge of other mobile wireless devices provides further knowledge such as if or how many people are in the venues adjoining geofences. It is understood within the scope of the invention that many instances of needing precise location can become more valuable as entry into blindspots or known physical locations (even in the absence of unique identifiers) are repetitive in the course of a guest's life and the mobile wireless device signal strength and calibrated vectors greatly improve the context and/or predictability of next event(s).

Figure 7:
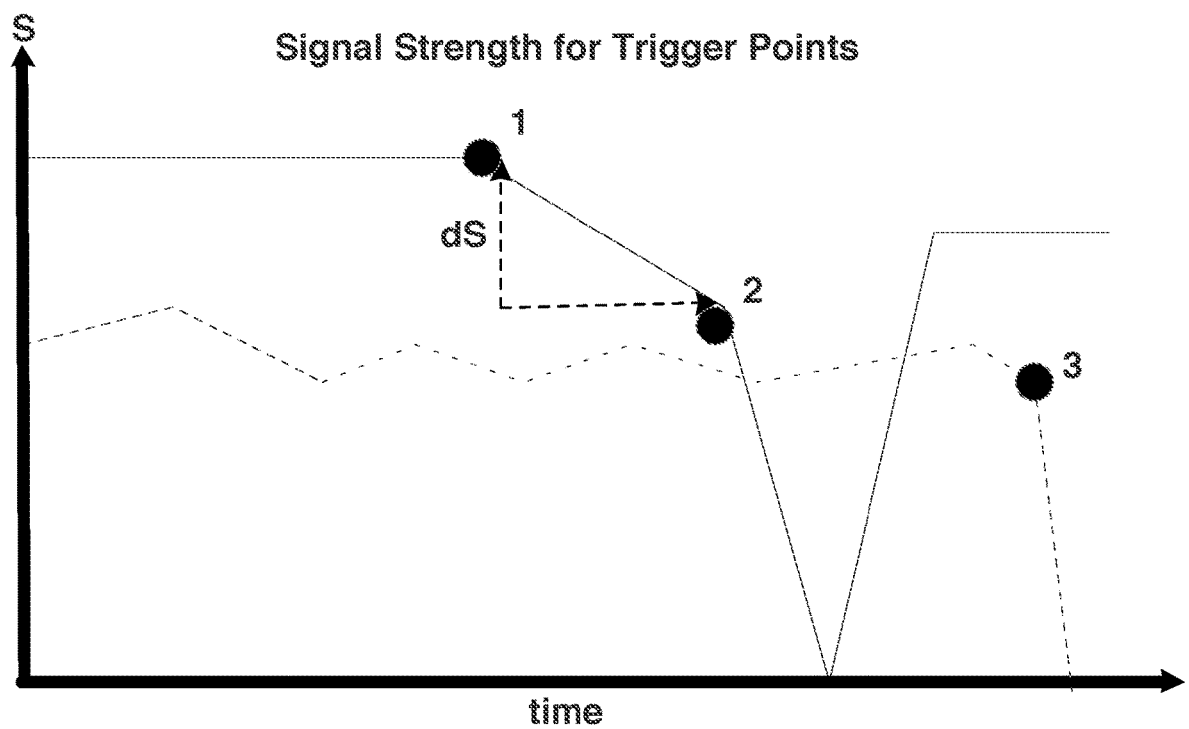
FIG. 7 is a graphical 2-dimensional representation of signal strength as a function of time embodiment

Turning to FIG. 7, FIG. 7 depicts the change in signal strength "dS" as a function of time, which establishes a dS/dt to compare to a signal strength reduction threshold to determine when a wireless device enters a blindspot. The transition between points 1 and 2 is relatively small as compared to the rapid decline after point 2 and then rapid return to relatively high signal strength. The dashed line is indicative of a wireless signal strength from a second directional antenna, which at point 3 is a clear indication of a blindspot. The changes in signal strength beyond their established signal strength threshold (which can vary, but typically larger than typical variations outside of blindspots that can be calculated by an average or means algorithm, or as otherwise known in the art). Trigger points to initiate an event are preferably provided for both entry into blindspot as well as departure from blindspot, notably for calculating adjustment parameters for calibrating the location vectors to increase location precision.

Figure 8:
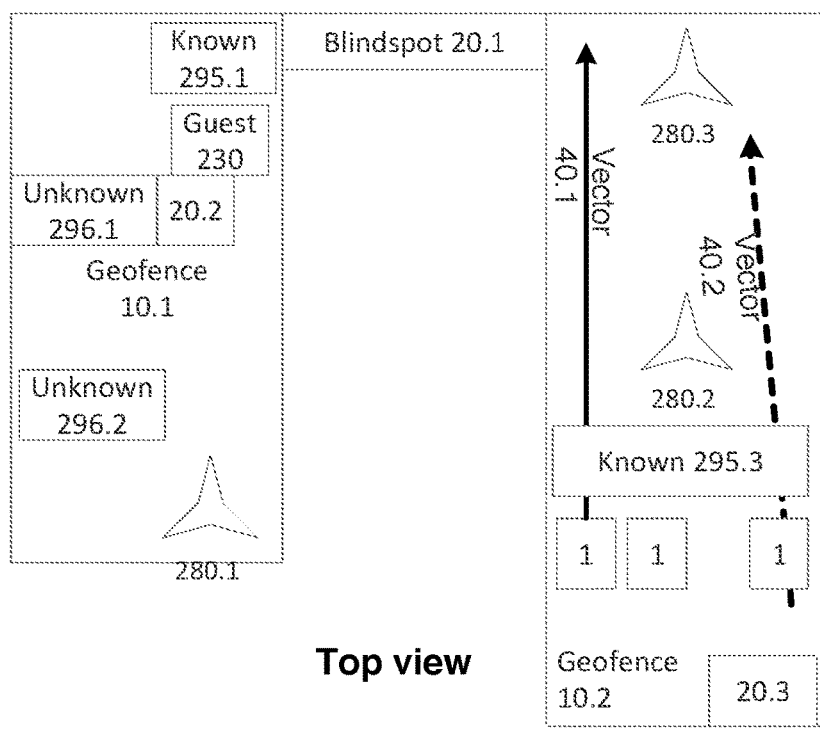
FIG. 8 is a top view physical layout representation of an airport embodiment

Turning to FIG. 8, FIG. 8 depicts an embodiment of the location accuracy enhancement system in an airport and airplane setting. The airplane is represented by geofence 10.2 which has known blindspot 20.3 representing the onboard bathroom (which can provide valuable information following the deplaning back into the airport represented by geofence 10.1) as one important result of this system is to not only establish high precision location determination of the guest 230 but also to predict the time it will take for the guest 230 to travel from the deplaning gate to a specific unknown geofence represented by 296.1 and 296.2. The term "unknown" in the context of an unknown geofence means that a host/guest/patron/passenger does not have a reservation (i.e., a scheduled time) in which it is known that the host will be within the geofence. Therefore the unknown geofence is also referred to as a reservationless physical location and thus interchangeably used with unknown physical location. One exemplary distinguishing between a known physical location and a reservationless/unknown physical location is a passenger on board a United Airlines flight where assigned seating is provided versus a Southwest Airlines passenger not having an assigned seat, with the latter not enabling a calibration vector once it is determined that the passenger is seated. One such exemplary use of this information is to determine travel time from gate to a food serving location (e.g., McDonald's) to properly queue in food orders for delivery notably when wireless communications are utilized onboard of the plane during flight to place a food order. Tracking the guest 230 (a.k.a. passenger) using a bathroom during in-flight operations reduces the likelihood that a pit-stop at unknown 296.1 is needed prior to walking to the food serving location indicated as unknown 296.2. The nomenclature of "unknown" solely indicates the lack of knowledge of prior travel times as virtually all the time the passenger will not have previously traveled the same route, however it is a known distance between the unknowns 296.1 and 296.2 to the blindspot 20.1 (which represents the jet way in this embodiment). The placement of directional antennas 280.3 and 280.2 are purposeful in establishing WiFi communication while onboard of the airplane. The particular placement of 280.2 with the antenna direction being forward (i.e., towards the direction of the blindspot 20.1) to also create a blindspot (not shown) within the airplane. This embodiment demonstrates the utilization of a known geofence indicated by 295.3 representing a row in the airplane such that it is recognized the passenger could be traveling with either family or colleagues in which the specific indicated reserved seat is altered with another family or colleague member such that only the row is able to determined and not the specific seat in that row. A passenger/guest traveling alone has a specific assigned seat, representing a system known geofence 1 (where each instance represents an individual seat within a specific airplane row) thus providing a specific calibration point that occurs (at least) during the periods in which the passenger is essentially guaranteed to be seating (e.g., during takeoff, landing, taxiing, etc.). Vector 40.2 represents the lower accuracy location determination without the benefit of the blindspot calibration preferably in combination with the known seat 1 for the designated guest/passenger (as obtained via methods known in the art, notably communicating to the airline reservation system for the guest/passenger as determined by the less than accurate location via wireless device that does provide specific unique identification confirmation. The wireless device signal can also be linked to the guest/passenger record as established by checking in through the secured (and individual) barcode scanning (typical) of passenger as they enter known 295.1 physical location. Vector 40.1 represents the adjusted/calibrated high precision location determination to be used within a wide range of applications. This embodiment is like multiple additional non-airplane applications including attendance to concert/stadium event in which the guest has known reserved seating, also passing through a known physical location of ticket scanning upon entry to the venue. This embodiment is also like an employee (as guest) attending work where the employee has a typical office/cubicle or workstation (or at least a known workstation in accordance to a work-order or project management schedule). Other embodiments include animal husbandry (i.e., dairy operations, meat processing facility) where precise and unique identification is required from start to finish, yet the traditional wireless device location determination is both too inaccurate and also inconsistent across the outdoor to indoor environments. Yet another embodiment includes any utilization of drones, semi- or completely autonomous vehicles (e.g., coating or cleaning devices, logistics movement). The repeated utilization of a drone (for example) within the same environment provides for a unique opportunity to integrate a database record of calibration parameters to adjust for relatively inaccurate location determination as by traditional wireless device (as known in the art) as compared to a higher precision system that utilizes the known location of blindspots, plus any additional known locations (such as battery charging stations) or presence detection by non-identifying sensors.

Figure 9:
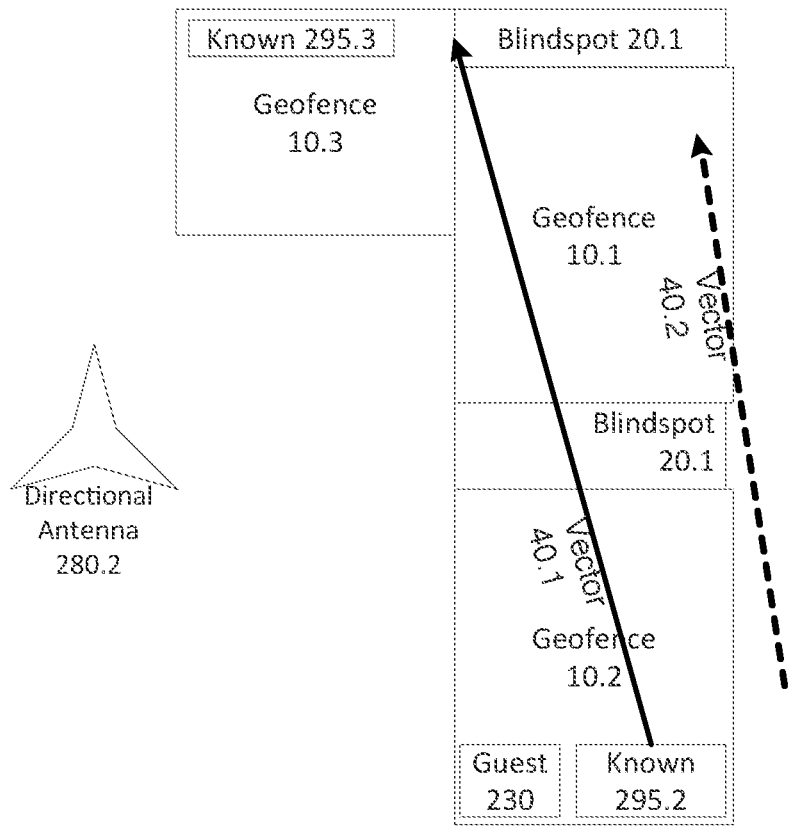
FIG. 9 is a top view physical layout representation of a residential home

Turning to FIG. 9, FIG. 9 depicts one embodiment in which a non-corrected vector 40.2 utilizes the at least one blindspot 20.1 (and preferably both to further improve the accuracy throughout the operating range). The utilization of both blindspots 20.1 provides multiple calibration points, with each calibration point being every vector entering and leaving the blindspot 20.1 (i.e., from north, south, east, west, etc.). At the very least, a set of vector records for each blindspot increases the precision for entry/departure into each blindspot 40.2 and more importantly using the closest blindspot 20.1 to a geofence 10.2 (when vector is north to south). The further combination of at least one known physical location, which has a method to obtain a precise location validation point (e.g., a barcode scanner such as checking in to a flight, entering a work office building, etc.), in combination with the blindspot 20.1. The at least one directional antenna 280.2 provides at least two directional beams in which a unique wireless signal (i.e., varying frequency and/or strength) is transmitted to a guest (which is host to wireless device 30, not shown on this figure). The calibration points are utilized to significantly increase the precision of the guest location from vector 40.2 to vector 40.1. Having yet another known physical location 295.3 becomes another calibration point specifically for improving accuracy within geofence 10.3, in addition to throughout the other geofences 10.1 and 10.2. It is recognized that within the calibration points, and also the records of actual vectors 40.2 corrected to vector 40.1, that the calibration points can yield a more precise vector 40.1 (though shown as a line) represented by numerous vector points where the connection between vector points can include error bars (as shown on FIG. 10 by ring 231 for the guest host 230) and also be an arc or a more complex non-linear calibration algorithm so as to provide increased accuracy especially in entry/departure vectors into geofences.

Turning to FIG. 10, FIG. 10 depicts a representative variation of location precision between a blindspot calibrated (left) system (the inventive system) versus the non-blindspot calibrated system (right). The location precision, as represented by the ring 231 and its respective diameter D.bc. (for calibrated) and D.nbc (for non-calibrated) is shown for the guest 230 (having the wireless mobile device, not shown) entering the geofence 10.3. It is recognized that the ring 231, though shown as a rectangle, can be virtually any shape and likely to be superior when represented by an expanding cone in the direction of guest travel and the expanding cone itself can have a probability indicator within the cone to provide yet further increase in location precision. The probability indicator is also referred to as "probability identification" when the precise location is determined by probabilistic means as known in the art.

Figure 11:
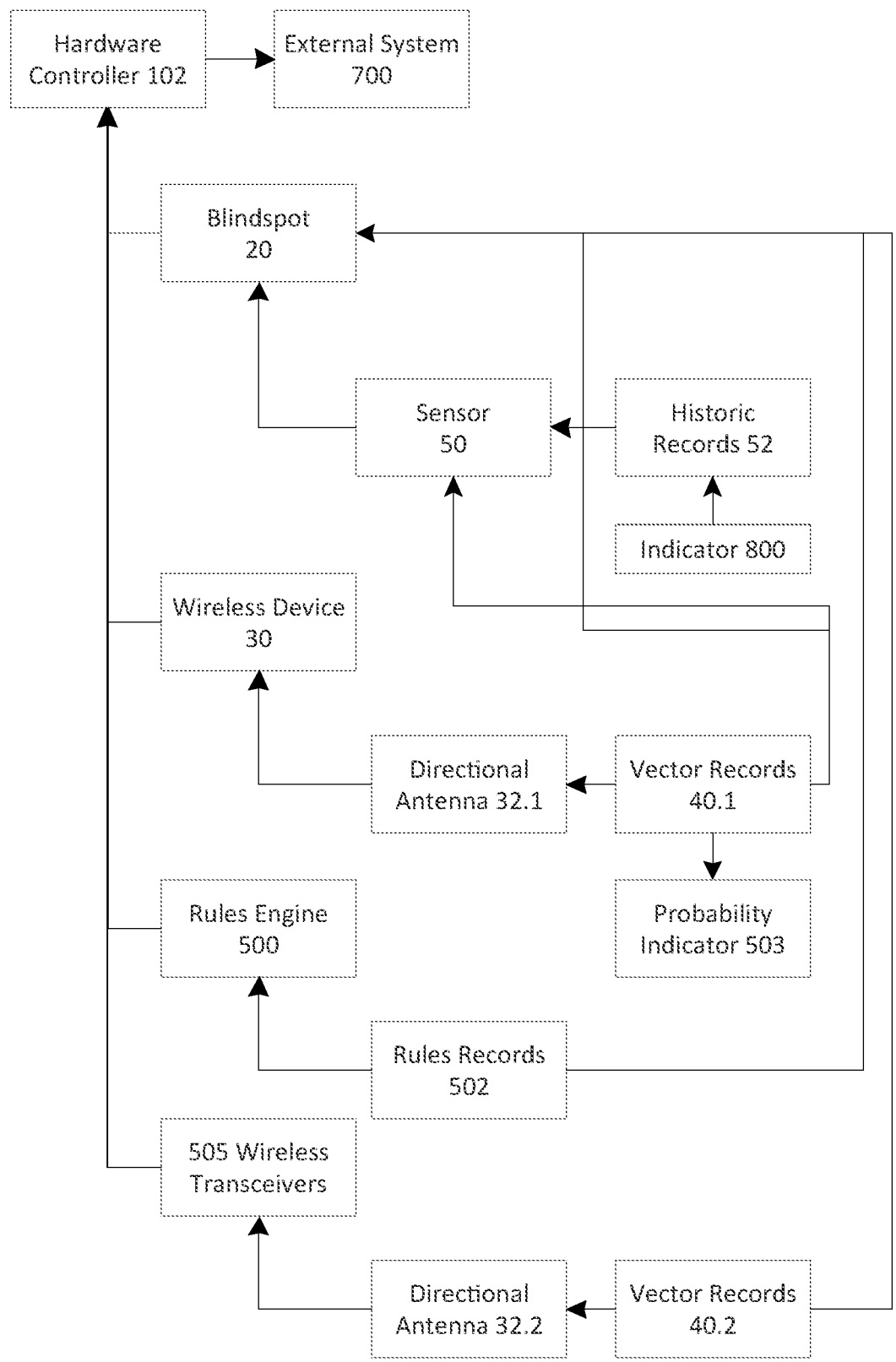
FIG. 11 is an hardware and software object structure diagram

Turning to FIG. 11, FIG. 11 depicts the control system implementing all embodiments of the invention. The control system has a hardware controller 102 that communicates and coordinates to all other hardware and software within the system through methods as known in the art. Each blindspot 20 has a record and a set of parameters with at least one sensor 50 that triggers the calibration point utilized to increase the location precision through a series of historic records 52 (largely vectors, and the vectors can further be linked/associated with a specific guest 230 and/or guest wireless mobile device 30. The historic records 52 also includes real-time record(s) that store in memory the status of devices that have gone "blind" (i.e., having either an abrupt elimination or reduction in wireless signal strength indicative of the wireless device 30 entering a blindspot 20. Within the memory is also the status of devices that have gone "live" meaning the departure from a blindspot. The fundamental goal of the hardware controller is to determine the highest probability indicator of the wireless device having triggered the entry/departure from the blindspot in conjunction with the last known vector position as established by the wireless device communications to/from the directional antenna. Further storing within the database/memory of the wireless device 30 with records for each directional antenna 32.1 in which the wireless device "sees" creates a series of vector records 40.1 such that the controller can optimize the precision location. It is understood that the vector records 40.1 stored are both historic to increase the probability of determining the right wireless device 30 when that wireless device is blind, in addition to real-time vectors. All of this vector analysis in combination with known blindspots, other known physical locations, etc. are logically processed by a rules engine 500 (i.e., rules based logic engine) having at least one rules record 502 that is triggered as a result of entry/departure into/from a blindspot 20. It is understood that the rules can be specific to wireless device type, guest, geofence, known physical location, known wireless transceiver 505 location with its at least one known directional antenna 32.2 coverage area characterized by at least one vector records 40.2 and/or registration point. The vector analysis in combination with historic records enables precise timing of travel events that can be communicated to an external system 700, with a precision that is significantly more accurate than a system void of blindspots or known physical location calibration points, to create indicators 800 indicative of a range of factors health stress, hurriedness, general worriedness (such as financial stress, which can be correlated to specific payment of bills cycles e.g., mortgage, or loans, or specific receipt of income cycles e.g., paycheck, rental income, etc. One exemplary use of hurriedness and worriedness indicators is for calculating insurance rates, including and notably for single trips within a shared-vehicle environment. Another exemplary use of the indicators 800 is for conveyance of this information (at least on a relative basis) to fellow employees, family members, health practitioners, etc. so as an external system 700 (or individual) can adjust actions/expectations.

Figure 12:
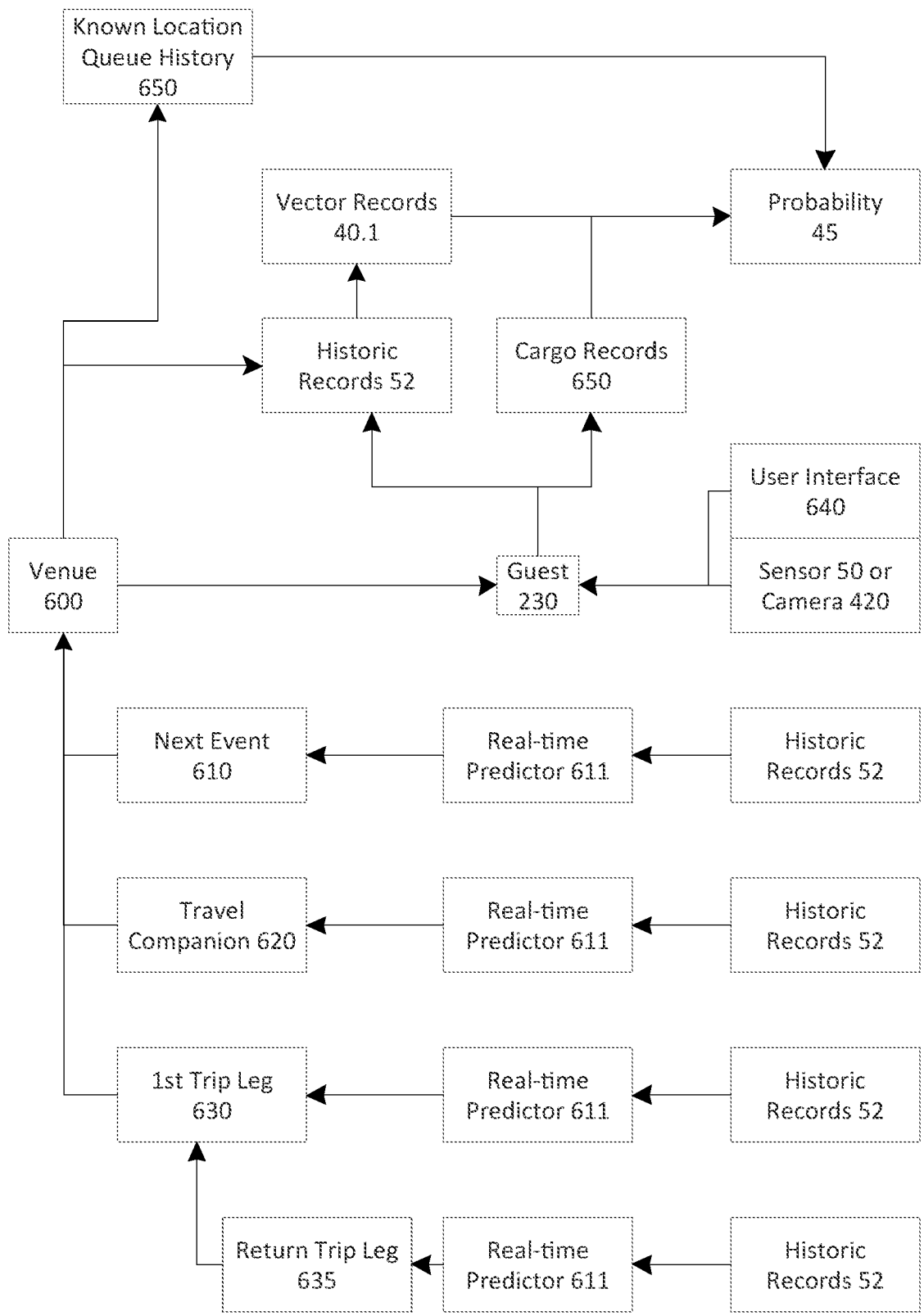
FIG. 12 is a venue centric data object structure diagram

Turning to FIG. 12, FIG. 12 is a venue centric object structure diagram within the control system embodiment of the invention. The venue can be virtually any location, but the fundamental objective is to maintain a database of venues 600 that include parameters such as venue type (e.g., work or residence location) which includes airports notably airplanes further characterized by gate location, time of day, calendar season, etc.; shopping malls includes supermarkets further characterized by parameters as obtained by guest 230 indexing such as sensor 50 triggers, camera 420 images (e.g., volume and item count estimation of guest shopping cart). Numerous parameters impact travel times (i.e., vector direction, speed, and total distance) including parameters that can be obtained through the guest 230 user interface 640 (e.g., smartphone, computer, etc.) such as whether or not the guest needs to make a "pit" stop (e.g., bathroom visit, other shopping list items, etc.) prior to proceeding to the next event 610. Another significant parameter that impacts travel time is whether or not the guest 230 has cargo (e.g., shopping bags, luggage, etc.) that is in tow and therefore the system has a cargo records 650 that maintain the impact on speed of travel as an adjustment parameter to the vector records 40.1 in order to calculate a probability travel time (and real-time location predictor) so as to determine proper queue arrival time at a known location. The maintaining of queue history at each known location queue history 650 increases the time accuracy in combination with real-time location accuracy plus adjustment by the probability 45 engine. Travel time is impacted by multiple parameters further including planned/scheduled next event(s) 610, that also have both a real-time predictor 611 to project/estimate arrival time from current precision location to the next event (preferably including historic travel times and travel methods indexed by guest 230). When the estimated arrival time is later than the scheduled next event 610 start time, the invention embodiment reduces the projected/estimated travel time to the next known location in which a known location queue history 650 is provided. Exemplary known location(s) include parking lot in which either autonomous vehicles are parked or shared-vehicles are queued in. Another exemplary known location is a bathroom such that a "pit" stop, in which a bathroom predictor is included in this invention based on knowledge of a $1^{st}$ trip leg 630 and/or prior entry/departure from a previously visited known location 295 (not shown in this figure) or unknown location 296 (also not shown on this figure). Yet another impact on travel time is whether or not the guest 230 is accompanied by a travel companion 620 including parameters of that companion such as whether the guest knows the travel companion (i.e., a worker colleague, a family member, etc.) in which the combination of any travel time historic records 52 associated with the travel companion enables an adjustment on travel time through the real-time predictor 611.

Reference to the real-time predictor 611 and its function is virtually identical in each instance for next event 610, travel companion 620, $1^{st}$ trip leg 630, and return trip leg 635. In the event of imperfect information, particularly the absence/void of cargo in tow knowledge, the utilization of travel times such as in the $1^{st}$ trip leg 630 provides superior travel time accuracy (at least 5% more accurate than without such adjustment) for the associated return trip leg 635. An exemplary of this is a passenger leaving the home originating city with carry-on luggage in tow (where this fact is not known) that will be taken on the plane, therefore providing a superior indication of travel time for the return trip leg 635 as the same carry-on luggage will be in tow after arriving at the airplanes destination. It is understood that reference to airplane is analogous to train or bus and thus interchangeable.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A precision location system comprised of:
a control system having a rules based logic engine and located at a known stationary location; an at least one stationary wireless transceiver serving as communication with the control system; an at least one mobile wireless device having a varying location and in communication with the control system through the at least one stationary wireless transceiver; a wireless signal strength change dS as a function of time dt above a dS/dt threshold from the at least one stationary wireless transceiver to the at least one mobile wireless device; an at least one blind spot whereby the blind spot is at a known stationary location; the at least one mobile wireless device varying location is established by the precision location system control system and not by the at least one mobile wireless device; and wherein the at least one mobile wireless device varying location is calibrated by the precision location system control system by the at least one mobile wireless device entering the blind spot known stationary location through the wireless signal strength change dS being reduced by at least 20% or the at least one mobile wireless device leaving the blind spot known stationary location by the wireless signal strength change dS respectively being increased by at least 20%
whereby the blind spot device or the wireless reflector is further comprised of a presence sensor, whereby the blind spot device or the wireless reflector makes the at least one mobile wireless device intentionally fail to communicate with the control system at the fixed stationary location, and whereby the at least one mobile wireless device entering or leaving the blind spot device establishes a precise timing of the failure to communicate with the control system and establishing the at least one mobile wireless device at the blind spot known stationary location;
whereby the at least one mobile wireless device varying location has an accuracy of at least 5% better with the use of the at least one blind spot, as compared to without the at least one blind spot, when the at least one mobile wireless device immediately fails to communicate to the control system or renews communication to the control system; whereby the at least one mobile wireless device varying location has a historic travel pathway that is retroactively improved by at least one foot by calibrating the wireless signal strength through the use of a first blind spot having a known stationary location and a second blind spot having a known stationary location from the at least one blind spot; and whereby the historic travel pathway is adjusted by a wireless signal strength calibration adjustment parameter to provide an improved accuracy by at least one foot when the at least one mobile wireless device travels in the future between the first blind spot and the second blind spot.

2. The precision location system according to claim 1 whereby the at least one mobile wireless device varying location has an accuracy of at least 5% better with the use of the at least one blind spot, as compared to without the at least one blind spot, when the at least one mobile wireless device immediately fails to communicate to the control system or renews communication to the control system; whereby the at least one mobile wireless device varying location has a historic travel pathway that is retroactively improved by at least one foot by calibrating the wireless signal strength through the use of a first blind spot having a known stationary location and a second blind spot having a known stationary location from the at least one blind spot; and whereby the historic travel pathway is adjusted by a wireless signal strength calibration adjustment parameter to provide an improved accuracy by at least one foot when the at least one mobile wireless device travels in the future between the first blind spot and the second blind spot.

3. The precision location system according to claim 1 whereby the blind spot is further comprised of a wireless power transmitter to the at least one mobile wireless device and whereby the at least one mobile wireless device receives power from the wireless power transmitter to enable subsequent communication to the control system upon leaving the blind spot device; or whereby the blind spot is further comprised of an at least one line of sight presence sensor or a non-identity recognizing sensor within a blind spot geofence having a known stationary location.

* * * * *